United States Patent [19]

Beal

[11] Patent Number: 4,648,649
[45] Date of Patent: Mar. 10, 1987

[54] CAMPER-TRUCK ASSEMBLY AND MOUNTING HARDWARE

[76] Inventor: James L. Beal, 4010 Acorn La., Porter, Tex. 77365

[21] Appl. No.: 739,605

[22] Filed: May 30, 1985

[51] Int. Cl.$^4$ ............................................. B60P 3/42
[52] U.S. Cl. .................................... 296/156; 296/100
[58] Field of Search ............... 296/164, 165, 167, 156, 296/175, 100, 35.3, 220; 403/381

[56] References Cited

U.S. PATENT DOCUMENTS

| | | | |
|---|---|---|---|
| 3,473,839 | 10/1969 | Elbe | 296/164 |
| 3,773,380 | 11/1973 | Stockdill | 296/100 |
| 3,897,100 | 7/1975 | Gardner | 296/156 |
| 4,157,201 | 6/1979 | Collins et al. | 296/156 |
| 4,273,377 | 6/1981 | Alexander | 296/100 |
| 4,300,271 | 11/1981 | Wohlhaupter | 403/381 |
| 4,397,497 | 8/1983 | Alonzo, Jr. et al. | 296/165 |

FOREIGN PATENT DOCUMENTS 3119363  5/1981  Fed. Rep. of Germany ...... 296/100

*Primary Examiner*—Robert B. Reeves
*Assistant Examiner*—Carol L. Olson
*Attorney, Agent, or Firm*—Neal J. Mosely

[57] ABSTRACT

A novel camper-truck assembly is disclosed including mounting hardware therefor. The mounting hardware comprises a first set of rail members secured to the top surface of the truck bed side walls and a second set of rails secured to the underside of the camper top for sliding-locking engagement therewith. One of the rail members has a longitudinal rib slidably received in a slot on the second rail member and configured to secure the same together. The rib and slot have a generally wedge-shaped "dove tail" cross section. Weather seal members positioned between the top surface of the truck bed side walls and the rail members secured thereon seal against air and water leakage along the top surface of the truck bed front wall, side walls, and tailgate. Cam fasteners releasably lock the rail members against relative movement therebetween. The mounting rails may be provided as a kit of parts for installation by the user on conventional truck bodies and camper tops or as original equipment by the truck manufacturer or dealer.

8 Claims, 9 Drawing Figures

CAMPER-TRUCK ASSEMBLY AND MOUNTING HARDWARE

BACKGROUND OF THE INVENTION

1. Field of the Invention

This invention relates generally to camper-truck assemblies, and more particularly to hardware for installation, removal, and anchoring of camper tops to the bed of pickup trucks.

2. Brief Description of the Prior Art

In recent years, pickup campers have become quite popular and appear on the market in a variety of different shapes, models and designs. The conventional proceedure for installing the camper top is to lift or raise the camper top with jacks or other conventional lifting means above the side walls of the truck bed and position the stake holes of the truck bed with posts depending from the camper top, then lowering the camper top onto the bed. The camper top is commonly secured to the truck bed by simply bolting thereto in some manner, or bolting the depending posts into the stake holes. The steps are reversed in the removal of the camper top.

Due to variations in bed size, shape, and spacing of the stake holes, each camper top is often custom fitted to a particular truck body and secured thereto in a number of different ways. Adapters may be used in some cases in order to adapt the stake hole spacing to a particular camper top and to properly position the camper top on the truck body.

Anchoring of the camper top on the truck body is of utmost importance since during travel of the pickup truck with the camper top mounted thereon, the same is subjected to vibrations, shock, etc. as the truck travels along the highway. As is well known, a pickup truck having a camper top installed thereon will often deviate from the main highway and travel over rough terrain.

It is very difficult, if not impossible, with conventional installation proceedures to prevent the camper top from developing rattles, squeeks, and leakage problems around the points of attachment.

There are several patents which disclose truck bed attachments for securing camper tops and installing auxilliary devices on the truck body.

Temp, U.S. Pat. No. 2,784,027, discloses a drawer unit installed between the bed of a pickup truck and a false load-carrying floor installed thereabove. The drawer includes a complete kitchen and commissary unit, and is provided with rollers on the sides which rise on rails extending upwardly from the bottom of the bed.

Panchiocco, U.S. Pat. No. 3,471,045, discloses an auxilliary support positioned along each side of the side walls of a pickup truck bed for carrying a track which can be secured on top or moved to a dumping position. The device comprises a tool box or a carriage having rollers on the sides which ride on channels secured to the inner sides of the truck bed. The device is used for transporting tools and materials to a job site and for dumping the scrap materials.

Wood, U.S. Pat. No. 3,826,529, discloses a guide rail construction for slidably securing a tool cabinet along one side of of a pickup truck. The device comprises a tool cabinet having rollers on the bottom side which ride in channels secured to a rack supported on the bottom and inner sides of the truck bed. The device is used for transporting tools and the cabinet may be pulled completely out of the truck bed.

Stoll, U.S. Pat. No. 4,231,610 discloses a camper anchoring and locking structure. The structure comprises first rail members which are secured to the underside or bottom of the camper body and coupled with mating second rail members secured to a post which extends into openings in the sides of the truck body. The second rail members are adjusted longitudinally along the length of the first rail members to obtain the appropriate spacing between posts to properly fit the openings in various truck bodies.

Martin, U.S. Pat. No. 4,444,427, discloses a set of first rails having leg extensions to be received in the stake hoes on opposite sides of a pickup truck bed and a set of second rails attached thereto and having a series of offset stake holes which provide extensions for supporting objects above the side walls of the bed.

The prior art in general, and these patents in particular, do not disclose the present invention of a camper-truck assembly and the special mounting hardware therefor.

SUMMARY OF THE INVENTION

It is therefore an object of the present invention to provide mounting hardware comprising a guide rail attachment having one member attached to the underside of a camper top and another member mounted to the bed of a truck whereby the camper top may easily slide on and off of the truck bed.

Another object of this invention is to provide mounting hardware comprising a guide rail attachment having one member attached to the underside of a camper top and another member mounted to the bed of a truck whereby the camper top may be firmly secured to the truck bed.

Another object of this invention is to provide mounting hardware comprising a guide rail attachment for connecting the camper top to the bed of a truck which provides a weather resistant seal around the camper top at the point of connection.

Another object of this invention is to provide mounting hardware comprising a guide rail attachment for connecting the camper top to the bed of a truck which may be sold in kit form and easily installed by the user.

Another object of this invention is to provide mounting hardware comprising a guide rail attachment for connecting the camper top to the bed of a truck which will fit a wide variety of truck beds and camper tops with every little modification.

Another object of this invention is to provide mounting hardware comprising a guide rail attachment for connecting the camper top to the bed of a truck which is attractive in appearance, simple in construction, inexpensive to manufacture, and rugged and durable in use.

Other objects of the invention will become apparent from time to time throughout the specification and claims as hereinafter related.

The above noted objects and other objects of the invention are accomplished by a combined camper installation, removal, and locking structure for securing a camper top on a truck body comprises a first set of rail members having a longitudinal extending projection which is secured to the top surface of the truck bed side walls and a second set of rails having a longitudinal extending slot secured to the underside of the camper top for sliding engagement therewith. A plurality of cam fasteners interconnect the first and second rail members for releasably locking the rail members against relative movement therebetween.

DESCRIPTION OF THE PREFERRED EMBODIMENT

Figure 1:
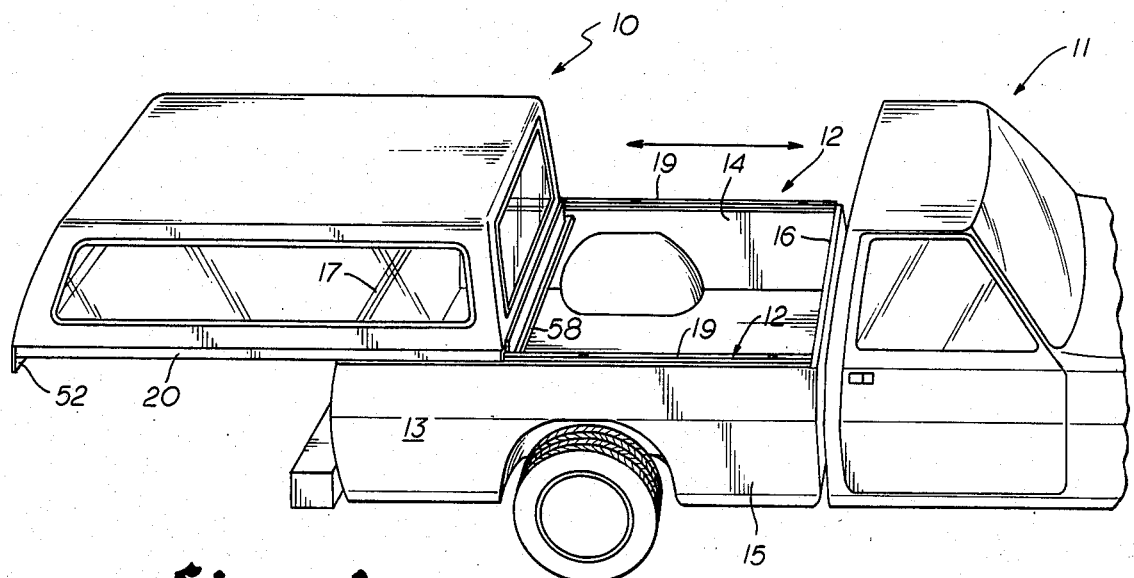
FIG. 1 is a perspective view of the mounting guide rails in accordance with the present invention installed on the bed of a pickup truck and a camper top being moved thereon.
Figure 2:
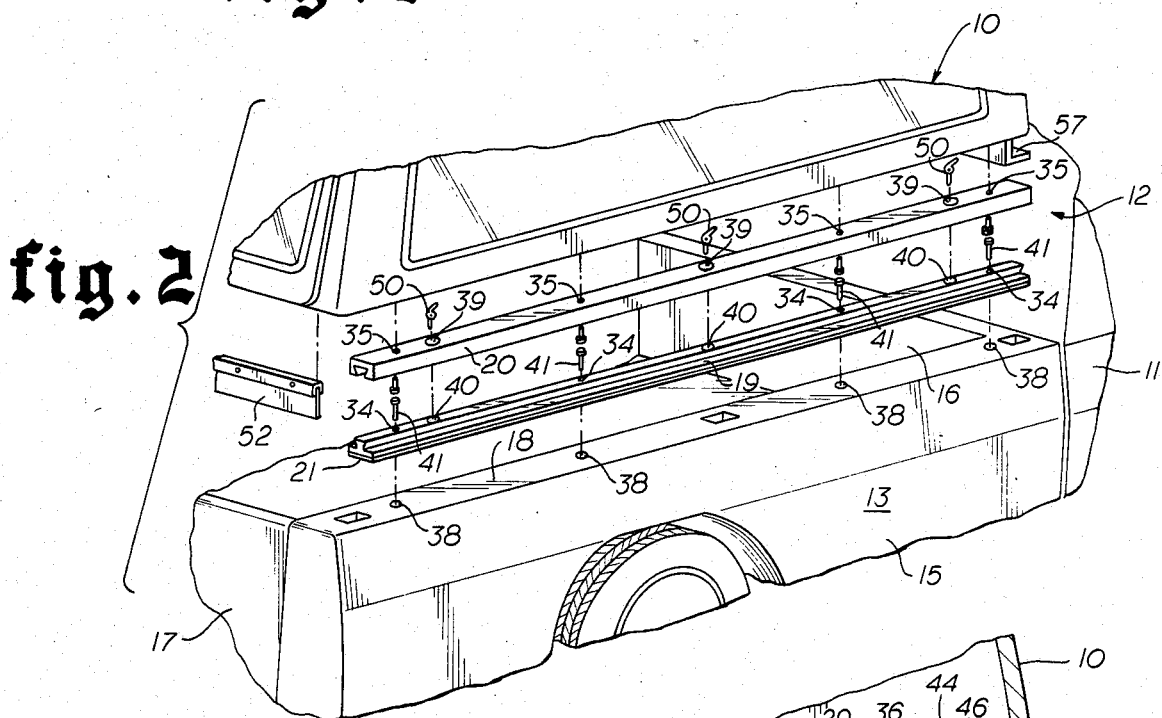
FIG. 2 is an exploded isometric view of the components of a mounting guide rail with surrounding portions of the truck bed and camper top.

Referring to the drawings by numerals of reference, and particularly to to FIG. 1, there is shown a camper top 10 being installed on a conventional pickup truck 11 having mounting guide rails 12 according to the present invention installed thereon. The pickup truck 11 has a bed 13 defined by a first side wall 14, an opposed second side wall 15, a front wall 16, and a tailgate 17. As best shown in FIG. 2, each side wall is characterized by a generally flat planar top surface 18 in which a plurality of stake holes are formed.

The mounting guide rails 12 comprise a pair of elongated lower rail members 19, each of which is attached to the top surface 18 of the side walls 14 and 15. Each one of a pair of elongated upper rail members 20 is attached to the underside of the camper top 10.

Figure 3:
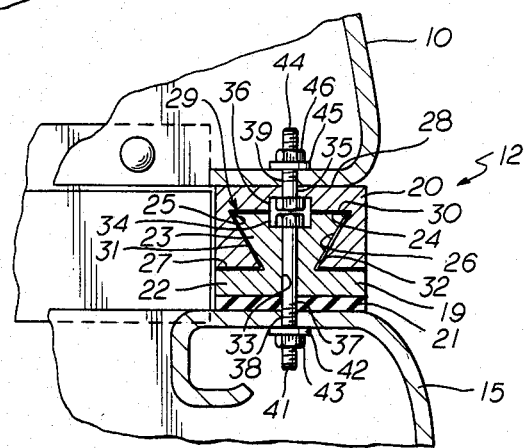
FIG. 3 is an elevational view in vertical cross section of a mounting guide rail assembled on the truck bed and camper top.

In FIGS. 2 and 3, a flat elongated weather seal strip 21 of resilient material is installed on the upper surface 18 of each side wall 14 and 15. The lower rail member 19 has a flat base portion 22, and a longitudinal rib 23 of wedge-shaped cross section. The wedge-shaped rib 23 has a flat top surface 24 which is parallel to, and narrower than the width of the base 22. The opposed sides 25 and 26 of the projection 23 taper angularly downward and inwardly forming a male "dove tail" configuration when viewed in cross section.

The upper rail member 20 has a flat bottom surface 27, a parallel flat top surface 28, and a centrally disposed wedge-shaped cavity or slot 29. The wedge-shaped slot 29 has a flat top surface 30 which is parallel to, and narrower than the width of the top surface 28. The opposed sides 31 and 32 of the slot 29 taper angularly downwardly and inwardly forming a generally female "dove tail" configuration when viewed in cross section. It should be understood that the inner periphery of the slot 29 is slightly larger than the wedge-shaped projection 23 of the lower member 19 to be slidably received longitudinally thereon. It should be further understood that the female "dove tail" could be integrally formed into the underside of the camper top.

As seen in FIG. 3, a plurality of longitudinally spaced vertical bores 33 and counterbores 34 extend through the lower rail member 19. Similarly, a series longitudinally spaced vertical bores 35 and counterbores 36 extend through the upper rail member 20. The flat weather seal strip 21 is likewise provided with a series of longitudinally spaced bores 37 in vertical alignment with the bores 33 of the lower rail member 19. Longitudinally spaced holes 38 are drilled in the upper surface 18 of the truck side walls in alignment with the bores 37 and 38, and a second plurality of longitudinally spaced holes 39 are drilled in the underside of the camper top 10 in alignment with bores 35 in the upper rail member 20.

It should be understood that the aforementioned bores in the lower and upper rail members and the weather strip may be pre-formed at the point of manufacture and used as a template for marking and drilling the appropriate bores in the upper surface of the truck side walls and the camper top. Such being the case, the weather strip 21 and lower rail member 19 is placed on the upper surface 18 and secured thereon by bolts 41, washers 42, and nuts 43. The upper rail member 20 is secured on the underside of the camper top 10 by bolts 44, washers 45, and nuts 46.

Figure 4:
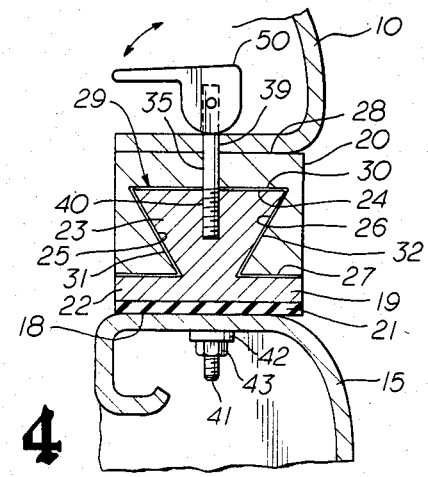
FIG. 4 is an elevational view in vertical cross section of the two longitudinal components of a mounting guide rail secured together on the truck bed and camper top.

Referring now to FIG. 4, the lower rail member 19 is provided with a plurality of threaded bores 40 and appropriate aligned bores 39 are drilled through the underside of the camper top 10 by the template method outlined above. After the camper top has been installed, and the upper and lower rail members are properly positioned, a plurality of cam type fasteners 50 are installed through the bores 39 and threadedly received in the threaded bores 40. The cam fasteners 50 may then be pivoted to the biased locked position against the top surface of the underside of the camper top to firmly secure the camper top and rail members together and prevent any movement therebetween.

Figure 5:
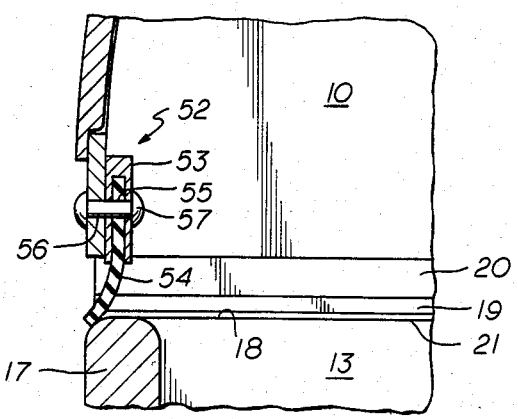
FIG. 5 is an elevational view in vertical cross section of the rear seal component of the mounting guide rail system.

As shown in FIG. 5, a rear seal members 52 is installed across the lower portion of the rear wall of the camper top 10. The rear seal member 52 comprises an inverted U-shaped channel 53 having a flat resilient seal 54, the upper portion of which is secured within the U-shaped channel and the lower portion of which depends outwardly therefrom to seal on the tailgate 17. A plurality of bores 55 extend transversly through the seal member 52 and a plurality of holes 56 are drilled in the lower portion of the rear wall of the camper top by the template process outlined above. The rear seal 52 is secured to the rear wall by means of bolts or rivets 57.

The height of the rear seal member 52 is sufficient to fill the space between the truck bed and the bottom of the camper top caused by the added height of the rail assembly. The resilient seal 54 in cooperation with the seal 21 beneath the lower rail member 19 provides a continuous weather resistant barrier around the sides and rear portion of the camper top. It should be understood that the seal member 52 could also be installed on the door of the camper top on those types of camper tops where there is no bottom portion at the rear wall and the door is in direct contact with the tailgate.

Figure 6:
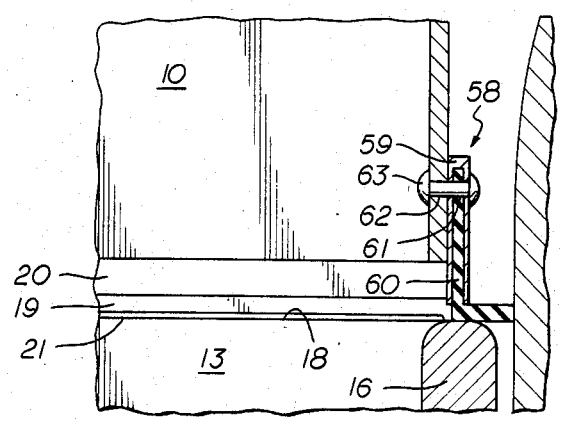
FIG. 6 is an elevational view in vertical cross section of the front seal component of the mouinting guide rail system.

FIG. 6 shows a front seal member 58 installed across the lower portion of the front wall of the camper top 10. The front seal member 58 comprises an inverted U-shaped channel 59 having an L-shaped resilient seal 60, the upper portion of which is secured within the U- shaped channel 59 and the lower portion of which depends outwardly therefrom to seal on the front wall 16 of the truck bed 13. A plurality of bores 61 extend transversely through the seal member 58 and a plurality of holes 62 are drilled in the lower portion of the front wall of the camper top by the template process outlined previously. The front seal is secured to the front wall by means of bolting or rivets 63.

The height of the front seal member 58 is sufficient to fill the space between the truck bed and the bottom of the camper top caused by the added height of the rail assembly. The resilient seal 60 in cooperation with the seal 21 beneath the lower rail member 19 provides a continious weather resistant barrier around the sides and front portion of the camper top.

Figure 7:
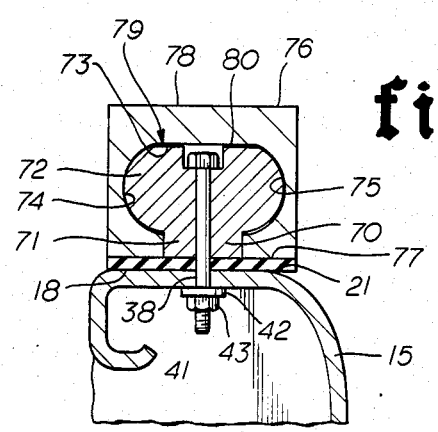
FIGS. 7, 8, and 9 are elevational views in vertical cross section of variations of the two longitudinal components of the mounting guide rails.
Figure 8:
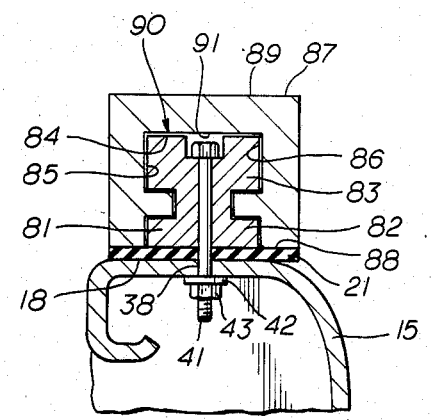
Figure 9:
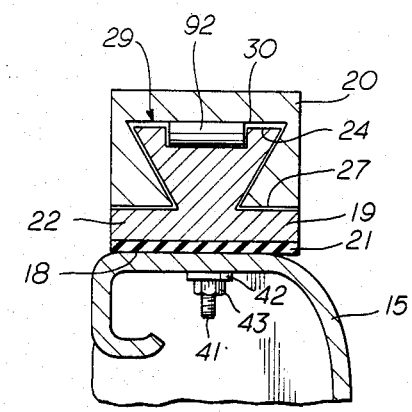

FIGS. 7, 8, and 9 show various modifications of the "dove tail" configuration of the lower and upper guide rail members. Certain components shown in the figures are identical to those previously described and are assigned the same numerals of reference. Description of those parts will not be repeated here to avoid unnececcesary repetition.

In the embodiment of FIG. 7, the lower member 70 has a flat bottom portion 71, and a rounded upper projection 72. The rounded upper projection 72 has a flat top surface 73 which is parallel to the bottom surface of the lower portion 71. The opposed rounded sides 74 and 75 of the projection 72 form a rounded male "dove tail" configuration when viewed in cross section.

Conversely, the upper member 76 has a flat bottom surface 77, a parallel flat top surface 78, and a centrally disposed rounded cavity or slot 79. The rounded slot 79 has a flat top surface 80 which is parallel to the top surface 73. The opposed rounded sides 74 and 75 of the slot 79 form a rounded female "dove tail" configuration when viewed in cross section. It should be understood that the inner periphery of the slot 79 is slightly larger than the rounded upper projection 72 of the lower member 70 to be slidably received longitudinally thereon.

In the embodiment of FIG. 8, the lower member 81 has a flat bottom portion 82, and a T-shaped upper projection 83. The T-shaped upper projection 83 has a flat top surface 84 which is parallel to the bottom surface of the lower portion 82. The opposed sides 85 and 86 of the projection 83 form a T-shaped male "dove tail" configuration when viewed in cross section.

The upper member 87 has a flat bottom surface 88, a parallel flat top surface 89, and a centrally disposed T-shaped cavity or slot 90. The T-shaped slot 90 has a flat top surface 91 which is parallel to the top surface 84. The opposed sides 85 and 86 of the slot 90 form a T-shaped female "dove tail" configuration when viewed in cross section. It should be understood that the inner periphery of the slot 90 is slightly larger than the projection 83 of the lower member 81 to be slidably received longitudinally thereon.

The embodiment shown in FIG. 9 is a modification of the assembly shown in FIG. 3, and identical parts are given the same numerals of reference. To avoid repetition, the description of those identical parts will not repeated here. As shown in FIG. 9, a plurality of transverse longitudinally spaced rollers 92 are rotatably disposed in the lower member 19 to extend slightly above the flat top surface 24 of the projection 23. The flat top surface 30 of the slot 29 of the upper member 20 is movably supported on the rollers 92 to facilitiate installation and removal of the camper top. The rollers are rendered inoperative when the cam fasteners are placed in the locked position.

OPERATION

The mounting guide rails are suitable for manufacture as a kit of parts to be easily installed by the user on a conventional pickup truck and camper top. Referring now to FIGS. 1 through 4 and particularly to FIG. 2, the flat elongated weather strips 21 are placed on the upper surface 18 of each side wall 14 and 15. The bores 37 in the weather strips are used a template for marking the spacing for drilling holes in the upper surface 18. The strips 21 are removed and holes 38 are drilled through the upper surface 18. The weather strips 21 are replaced, the lower rail members 19 are placed on the weather strips with the bores 33 in axial alignment with the drilled holes 38. Bolts 41 are placed through the bores 33 and 37 and aligned drilled holes 38. Washers 42 and nuts 43 are inserted on the bolts 41 and tightened to firmly secure the lower members to the upper surface 18 of the side walls.

A measurement is taken across the truck bed from center to center of the installed lower members and a line is drawn longitudinally on the bottom surface of each side of the camper top with the same transverse spacing. The upper members 20 are placed on the bottom surface of the camper top with the bores 35 in centered alignment over the drawn lines. The location for drilling holes is marked using the members 20 as a template, and the upper members are removed. Holes 39 are then drilled through the bottom surface of the camper top. The upper members are replaced with the drilled holes 39 in axial alignment with the bores 35. Bolts 44 are placed through the boxes 35 and aligned drilled holes 39. Washers 45 and nuts 46 placed on the bolts 44 are tightened to firmly secure the lower members to the bottom of the camper top.

The camper top is then raised to place the upper and lower rails in longitudinal alignment and the camper top is carefully moved toward the cab of the truck allowing the upper rail members to be received on the dove tail projection of the lower members. Once the members are engaged, the forward movement of the camper top is continued until the correct longitudinal position between the front wall 16 and the tailgate 17 is obtained.

The front seal member 58 is placed across the lower portion of the front wall of the camper top with the L-shaped resilient seal 60 in firm contact with the top surface of the front wall 16 of the truck bed. The location for drilling holes is marked using the front seal 58 as a template, and the seal member is removed. Holes 62 are then drilled through the front wall of the camper top. The front seal 58 is replaced with the drilled holes 62 in axial alignment with the bores 61. Bolts or rivets 63 are secured through the bores 61 and aligned drilled holes 62 to firmly secure the front seal to the front wall of the camper top. When properly positioned, the height of the front seal member is sufficient to fill the space between between the truck bed and the bottom of the camper top caused by the added height of the rail assembly. The resilient seal 60 in cooperation with the seal 21 beneath the lower rail member 19 provides a continious weather resistant barrier around the sides and front portion of the camper top.

In a similar fashion, the rear seal member 52 is placed across the lower portion of the rear wall of the camper top with the depending resilient seal 54 in firm overlapping contact with the tailgate 17. The location for drilling holes is marked using the rear seal 52 as a template, and the seal member is removed. Holes 56 are then drilled through the rear wall of the camper top. The rear seal 52 is replaced with the drilled holes 56 in axial alignment with the bores 55. Bolts or rivets 57 are secured through the bores 55 and aligned drilled holes 56 to firmly secure the rear seal to the rear wall of the camper top. When properly positioned, the height of the rear seal member is sufficient to fill the space between the tailgate and the bottom of the camper top caused by the added height of the rail assembly. The resilient seal 54 in cooperation with the seal 21 beneath the lower rail member 19 provides a continious weather resistant barrier around the sides and rear portion of the camper top.

Once the front and rear seals have been installed, the camper top is movably supported on the lower rails, and may be easily removed and installed as desired. When it is desired to secure the camper top to the truck bed, the camper top is slidably positioned with the bores 35 and 39 in axial alignment with the threaded bores 40. The cam type fasteners 50 are threadably installed through the bores 35 and 39. The cam fastener 50 may then be pivoted to the biased locked position against the top surface of the underside of the camper top to firmly secure the camper top and rail members together and prevent any movement therebetween.

While this invention has been described fully and completely with special emphasis upon a preferred embodiment, it should be understood that within the scope of the appended claims the invention may be practiced otherwise than as specifically described herein.

I claim:

1. A system for securing a camper top on a truck body comprising;
   a first set of mounting rail members secured to the top surface of the truck bed side walls having means for slidably receiving and engaging a second set of mounting rail members,
   said second set of mounting rail members secured to the undersurface of said camper top along the sides thereof, having means for slidably receiving and engaging said first set of mounting rail members,
   said receiving and engaging means of said mounting rail members comprises a longitudinally extending dove tail rib on one rail member and a longitudinally extending dove tail slot on the other rail member slidably receiving said rib,
   a set of side seal members disposed between said top surface of the truck bed side walls and said first mounting rail members,
   a front seal member secured to the front wall of said camper top for sealing engagement with the top surface of the truck bed front wall,
   said front seal member comprising an elongated inverted U-shaped channel having a longitudinal extending resilient seal, the upper portion of which is secured within the U-shaped channel and the lower portion of which depends outwardly therefrom and adapted to sealingly engage the front wall of the truck bed,
   said front seal member having a height sufficient to fill the space between the truck bed and the underside of said camper top when said first and second mounting rail members are engaged,
   a rear seal member secured to the rear wall of said camper top for sealing engagement with the truck bed tailgate,
   said rear seal member comprising an elongated inverted U-shaped channel having a longitudinally extending resilient seal, the upper portion of which is secured within the U-shaped channel and the lower portion of which depends outwardly therefrom and adapted to sealingly engage the tailgate of the truck bed,
   said rear seal member having a height sufficient to fill the space between the truck bed and the underside of said camper top when said first and second mounting rail members are engaged, and
   locking means interconnecting said first and second mounting rail members comprising a plurality of cam fasteners operatively connected between said first and second mounting rail members to releasably bias same together against relative movement therebetween.

2. The system of apparatus according to claim 1 wherein
   said dove tail configuration is of a generally wedge shaped configuration.

3. The system of apparatus according to claim 2 in which
   said rib is on the lower rail member, mounted on said truck, and including
   a plurality of transverse longitudinally spaced roller members rotatably disposed in the upper surface of said rib to extend slightly above the top surface thereof to facilitate installation of said rib in said slot.

4. The system of apparatus according to claim 1 wherein
   said dove tail rib has a cross section comprises generally rounded configuration having a flat top surface and opposed rounded sides curving outwardly therefrom, and
   said dove tail slot has a cross section comprising a centrally disposed generally rounded cavity having a flat top surface parallel to the top surface of said projection and opposed rounded sides which curve outwardly therefrom, the inner periphery of said cavity being sufficiently larger than the outer periphery of said rounded projection to be slidably received longitudinally thereon.

5. The combination of a camper top mounted on a truck wherein the camper top is scured to the truck body by mounting hardware comprising:
   a first set of mounting rail members secured to the top surface of the truck bed side walls having means for slidably receiving and engaging a second set of mounting rail members.
   said second set of mounting rail members secured to the undersurface of said camper top along the sides thereof, having means for slidably receiving and engaging said first set of mounting rail members.
   said receiving and engaging means of said mounting rail members comprising a longitudinally extending dove tail rib on one rail member and a longitudinally extending dove tail slot on the other rail member slidably receiving said rib.
   a front seal member secured to the front wall of said camper top for sealing engagement with the top surface of the truck bed front wall,
   said front seal member comprising an elongated inverted U-shaped channel having a longitudinally extending resilient seal, the upper portion of which is secured within the U-shaped channel and the lower portion of which depends outwardly therefrom and adapted to sealingly engage the front wall of the truck bed.

said front seal member having a height sufficient to fill the space between the truck bed and the underside of said camper top when said first and second mounting rail members are engaged, a rear seal member secured to the rear wall of said camper top for sealing engagement with the truck bed tailgate.

said rear seal member comprising an elongated inverted U-shaped channel having a longitudinally extending resilient seal, the upper portion of which is secured within the U-shaped channel and the lower portion of which depends outwardly therefrom and adapted to sealingly engage the tailgate of the truck bed, said rear seal member having a height sufficient to fill the space between the truck bed and the underside of said camper top when said first and second mounting rail members are engaged, and locking means interconnecting said first and second mounting rail members comprising a plurality of cam fasteners operatively connected between said first and second mounting rail members to releasably bias same together against relative movement therebetween.

6. The combination according to claim 5 wherein said dove tail configuration is of a generally wedge shaped configuration.

7. The combination according to claim 6 in which said rib is on the lower rail member, mounted on said truck, and including a plurality of transverse longitudinally spaced roller members rotatably disposed in the upper surface of said rib to extend slightly above the top surface thereof to facilitate installation of said rib in said slot.

8. The combination according to claim 5 wherein said dove tail rib has a cross section comprises a generally rounded configuration having a flat top surface and opposed rounded sides curving outwardly therefrom, and said dove tail slot has a cross section comprising a centrally disposed generally rounded cavity having a flat top surface parallel to the top surface of said projection and opposed rounded sides which curve outwardly therefrom, the inner periphery of said cavity being sufficiently larger than the outer periphery of said rounded projection to be slidably received longitudinally thereon.

* * * * *